United States Patent
Chu

(10) Patent No.: US 9,343,977 B2
(45) Date of Patent: May 17, 2016

(54) POWER CONVERSION APPARATUS AND OVER POWER PROTECTION METHOD THEREOF

(71) Applicant: Power Forest Technology Corporation, Hsinchu County (TW)

(72) Inventor: Kwan-Jen Chu, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 20 days.

(21) Appl. No.: 14/571,003

(22) Filed: Dec. 15, 2014

(65) Prior Publication Data

US 2016/0099648 A1  Apr. 7, 2016

(30) Foreign Application Priority Data

Oct. 6, 2014  (TW) .............................. 103134736 A

(51) Int. Cl.
*H02M 1/32* (2007.01)
*H02M 3/335* (2006.01)

(52) U.S. Cl.
CPC ................................. *H02M 3/33507* (2013.01)

(58) Field of Classification Search
CPC ........... H02M 1/32; H02M 1/34; H02M 1/38; H02M 1/40; H02M 3/28; H02M 3/335; H02M 3/337
USPC ............ 363/21.11, 21.18, 56.5, 56.01–56.11; 361/18, 30–33, 79, 93.1–93.7
See application file for complete search history.

(56) References Cited

U.S. PATENT DOCUMENTS

| 7,113,376 | B2* | 9/2006 | Nomura ............... H02H 7/0833 361/31 |
| 7,362,592 | B2* | 4/2008 | Yang ................. H02M 3/33507 363/21.13 |
| 7,504,815 | B2 | 3/2009 | Moyse et al. |
| 8,541,956 | B2* | 9/2013 | Lee .................... H05B 33/0851 315/291 |
| 2006/0227476 | A1 | 10/2006 | Yang |
| 2010/0231047 | A1* | 9/2010 | Lee ....................... H02J 7/0031 307/51 |
| 2013/0294118 | A1 | 11/2013 | So et al. |

FOREIGN PATENT DOCUMENTS

| TW | M278145 | 10/2005 |
| TW | I305906 | 2/2009 |
| TW | I451652 | 9/2014 |

OTHER PUBLICATIONS

"Office Action of Taiwan Counterpart Application", issued on Sep. 25, 2015, p. 1-p. 9.

* cited by examiner

Primary Examiner — Yemane Mehari
(74) Attorney, Agent, or Firm — J.C. Patents

(57) ABSTRACT

A power conversion apparatus and an over power protection method thereof are provided. A number of times a detection voltage being greater than a first reference voltage and a number of times the detection voltage being greater than a second reference voltage are counted, so as to obtain a first count value and a second count value, in which the detection voltage is a voltage on a resistor in response to a current flowing through a power switch. Stop switching the power switch when the first count value is greater than or equal to a first threshold value or when the second count value is greater than or equal to a second threshold value.

10 Claims, 7 Drawing Sheets

POWER CONVERSION APPARATUS AND OVER POWER PROTECTION METHOD THEREOF

CROSS-REFERENCE TO RELATED APPLICATION

This application claims the priority benefit of Taiwan application serial no. 103134736, filed on Oct. 6, 2014. The entirety of the above-mentioned patent application is hereby incorporated by reference herein and made a part of this specification.

BACKGROUND OF THE INVENTION

1. Field of the Invention

The invention relates to an electronic apparatus, and more particularly, relates to a power conversion apparatus and an over power protection method thereof.

2. Description of Related Art

In conventional technology, the primary purpose of using a power conversion apparatus is to convert an unstable and high alternating current (AC) input voltage supplied by the power company to a stable and low direct current (DC) output voltage suitable for various electronic devices. Therefore, the power conversion apparatus is widely used in computers, office automatic facilities, industrial control equipments, communication apparatuses and so on.

However, when an output terminal of the power conversion apparatus is open-circuit or short-circuit, the power conversion apparatus may continuously output abnormal large current. Accordingly, temperature of the power conversion apparatus or elements inside a load may increase abnormally, resulting in increased risk of damages to the power conversion apparatus or the elements inside the load.

SUMMARY OF THE INVENTION

The invention is directed to a power conversion apparatus and an over power protection method thereof, which are capable of providing an efficient over power protection, such that the power conversion apparatus or the electronic apparatus using the power conversion apparatus may be prevented from damage due to over voltage or over current continuously generated by the power conversion apparatus.

A power conversion apparatus of the invention includes a transformer, a power switch, a resistor, a pulse width modulation control unit, a frequency dividing unit, a first comparison unit, a second comparison unit, a first counting unit, and a second counting unit. The transformer has a primary side and a secondary side. A first terminal of the primary side is configured to receive an input voltage, and the secondary side is configured to provide an output voltage to an electronic apparatus. A first terminal of the power switch is coupled to a second terminal of the primary side, a second terminal of the power switch is coupled to a first node, and a control terminal of the power switch receives a pulse width modulation signal. The resistor is coupled between the first node and a grounding voltage. The pulse width modulation control unit is coupled to the control terminal of the power switch, and generates the pulse width modulation signal for switching the power switch. The frequency dividing unit is coupled to the pulse width modulation control unit, and divides frequency of the pulse width modulation signal to generate a first frequency-divided signal and a second frequency-divided signal. A power terminal of the first comparison unit is coupled to the first frequency-divided signal, and the first comparison unit compares a voltage of the first node received by an input terminal of the first comparison unit and a first reference voltage, so as to output a first comparison signal. A power terminal of the second comparison unit is coupled to the second frequency-divided signal, and the second comparison unit compares the voltage of the first node received by an input terminal of the second comparison unit and a second reference voltage, so as to output a second comparison signal. The first counting unit is coupled between an output terminal of the first comparison unit and the pulse width modulation control unit, counts a number of times the voltage of the first node being grater than the first reference voltage according to the first comparison signal, and disables the pulse width modulation control unit when the number of times the voltage of the first node being greater than the first reference voltage is greater than or equal to a first threshold; and The second counting unit is coupled between an output terminal of the second comparison unit and the pulse width modulation control unit, counts a number of times the voltage of the first node being grater than the second reference voltage according to the second comparison signal, and disables the pulse width modulation control unit when the number of times the voltage of the first node being greater than the second reference voltage is greater than or equal to a second threshold.

In an embodiment of the invention, the first comparison unit resets a count value of the first counting unit if the voltage of the first node is not greater than the first reference voltage during a period when the first comparison unit is enabled by the first frequency-divided signal, and the second comparison unit resets the count value of the second counting unit if the voltage of the first node is not greater than the second reference voltage during the period when the second comparison unit is enabled by the first frequency-divided signal.

In an embodiment of the invention, the first reference voltage is greater than the second reference voltage, and the first threshold is less than the second threshold.

In an embodiment of the invention, the power conversion apparatus further includes a third comparison unit, which is configured to compare the voltage of the first node received by an input terminal of the third comparison unit and a third reference voltage, and disable the pulse width modulation control unit when the voltage of the first node is greater than the third reference voltage.

In an embodiment of the invention, the power conversion apparatus further includes a feedback unit and a fourth comparison unit. The feedback unit is coupled to the secondary side, and configured to receive the output voltage thereby outputting a feedback signal. The fourth comparison unit is coupled to the feedback unit, compares a voltage of the feedback signal and a fourth reference voltage, and disables the pulse width modulation control unit when the voltage of the feedback signal is greater than the fourth voltage.

An over power protection method of a power conversion apparatus of the invention includes the following steps. A pulse width modulation signal is generated according a loading status of an electronic apparatus. A power switch in the power conversion apparatus is switched according to the pulse width modulation signal so that the power conversion apparatus provides an output voltage to the electronic apparatus. Frequency of the pulse width modulation signal is divided to generate a first frequency-divided signal and a second frequency-divided signal respectively. Whether a detection voltage is greater than a first reference voltage during a high voltage level of the first frequency-divided signal is determined. The detection voltage is a voltage on a resistor in response to a current flowing through a power switch. Whether the detection voltage is greater than a second reference voltage during a high voltage level of the second frequency-divided signal is determined. A number of times the detection voltage being greater than the first reference voltage is counted to obtain a first count value if the detection voltage is greater than the first reference voltage. A number of times the detection voltage being greater than the second reference voltage is counted to obtain a second count value if the detection voltage is greater than the second reference voltage. Whether the first count value is greater than or equal to a first threshold and whether the second count value is greater than or equal to a second threshold are determined. Stop switching a power switch when the first count value is greater than or equal to a first threshold value or when the second count value is greater than or equal to a second threshold value.

In an embodiment of the invention, the first count value is reset if the detection voltage is not greater than the first reference voltage, and the second count value is reset if the detection voltage is not greater than the second reference voltage.

In an embodiment of the invention, the first reference voltage is greater than the second reference voltage, and the first threshold is less than the second threshold.

In an embodiment of the invention, the over power protection method of the power conversion apparatus further includes determining whether the detection voltage is greater than a third reference voltage, and stop switching the power switch if the detection voltage is greater than the third reference voltage.

In an embodiment of the invention, the over power protection method of the power conversion apparatus further includes the following steps. A feedback signal is generated according to the output voltage. Whether a voltage of the feedback signal is greater than a fourth reference voltage is determined, and the power switch is stopped from switching if the voltage of the feedback signal is greater than the fourth reference voltage.

Based on the above, according to embodiments of the invention, the number of times the detection voltage being greater than the first reference voltage and the number of times the detection voltage being greater than the second reference voltage are counted, so as to obtain the first count value and the second count value. When the first count value is greater than or equal to the first threshold value or when the second count value is greater than or equal to the second threshold value, stop switching the power switch. The detection voltage is the voltage on the resistor in response to the current flowing through the power switch. Accordingly, the different thresholds may be set for the different reference voltages to stop switching the power switch earlier in case the detection voltage exceeds the specific voltages, such that damage to the power conversion apparatus or the electronic apparatus using the power conversion apparatus due to over voltage or over current continuously generated by the power conversion apparatus may be prevented in order to provide an efficient over power protection.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
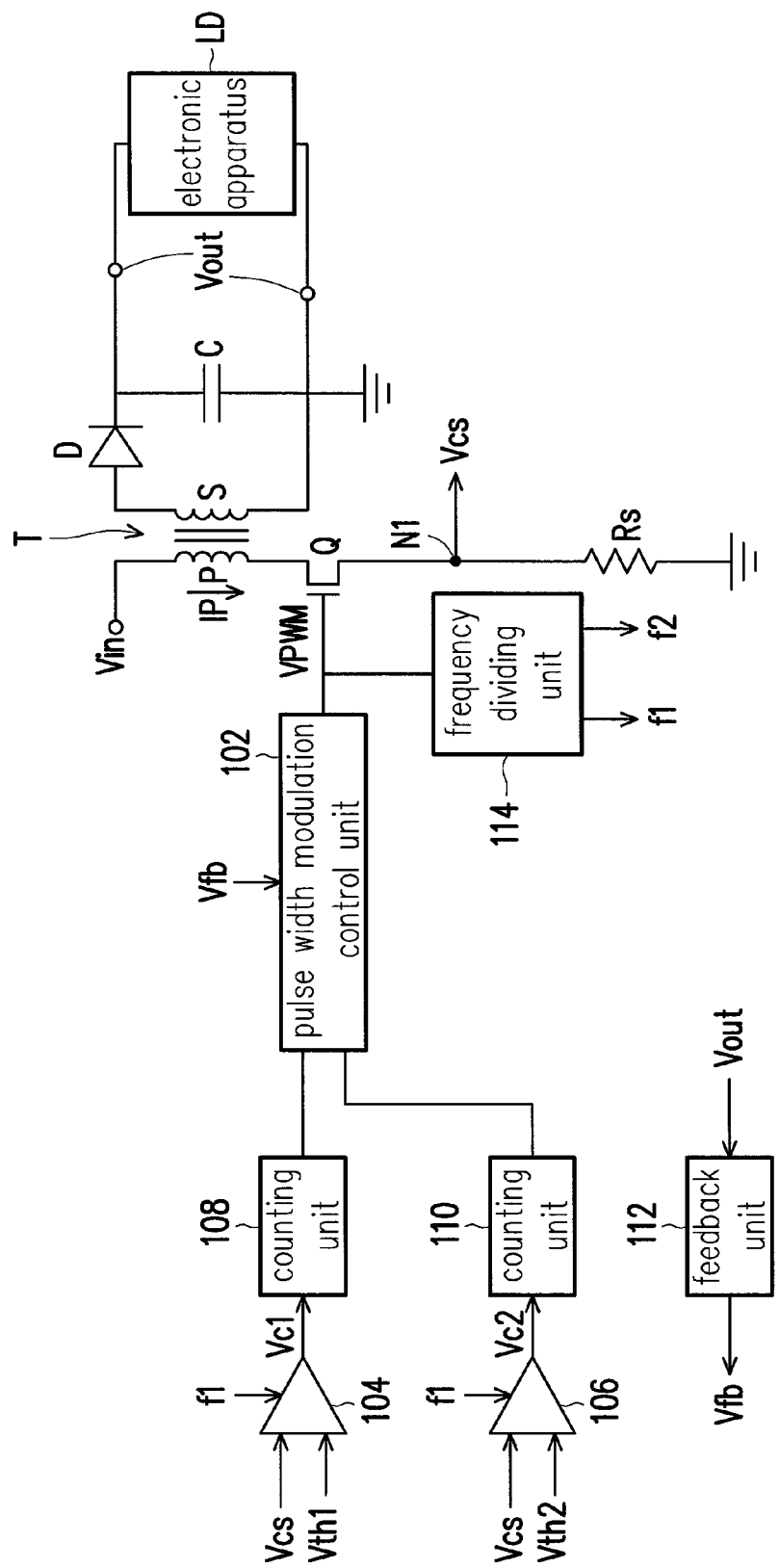
FIG. 1 is a schematic diagram illustrating a power conversion apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, which is a schematic diagram illustrating a power conversion apparatus according to an embodiment of the invention. The power conversion apparatus includes a transformer T, a power switch Q, a resistor Rs, a pulse width modulation control unit 102, a comparison unit 104, a comparison unit 106, a counting unit 108, a counting unit 110, a feedback unit 112, a frequency dividing unit 114, a diode D and a capacitor C. In the present embodiment, the transformer T includes a primary side P and a secondary side S. A first terminal of the primary side P of the transformer T is configured to receive an input voltage Vin, and the secondary side S of the transformer T is configured to provide an output voltage Vout to an electronic apparatus LD.

The input voltage Vin is a DC input voltage generated from an AC input voltage rectified by a rectifier. After the input voltage Vin received by the primary side P of the transformer T is responded to a voltage of the secondary side S of the transformer T (which is decided by a turn ratio of the primary side P and the secondary side S of the transformer T) and processed by a rectification of the diode D and a filtering of the capacitor C, the input voltage Vin is converted into the DC output voltage Vout required during operation of the electronic apparatus LD. An anode of the diode D is coupled to a first terminal of the secondary side S of the transformer T, and a cathode of the diode D is coupled to the electronic apparatus LD. Further, a first terminal of the capacitor C is coupled to the cathode of the diode D, and a second terminal of capacitor C is coupled to a second terminal of the secondary side S of the transformer T and a grounding voltage.

The feedback unit 112 is coupled to the secondary side S of the transformer T, and configured to receive the DC output voltage Vout thereby outputting a feedback signal Vfb related to a loading status of the electronic apparatus LD. It should be noted that, the feedback unit 112 may be in any circuit type as long as the feedback signal related to the loading status of the electronic apparatus LD can be outputted. For example, a resistance-voltage divider may be used together with an optical coupler to serve as the feedback circuit, but the implementation of the feedback unit 112 is not limited thereto. The pulse width modulation control unit 102 is coupled to a control terminal of the power switch Q and a node N1, and configured to generate a pulse width modulation signal VPWM according to the feedback signal Vfb outputted by the feedback unit 112. A first terminal of the power switch Q (e.g., a N-type transistor) is coupled to a second terminal of the primary side P of the transformer T, a second terminal of the power switch Q is coupled to the node N1, and the control terminal of the power switch Q receives the pulse width modulation signal VPWM. The resistor Rs is coupled between the node N1 and the grounding voltage.

The frequency dividing unit 114 is coupled to the pulse width modulation control unit 102, the comparison unit 104 and the comparison unit 106, and configured to divide frequency of the pulse width modulation signal VPWM outputted by the pulse width modulation control unit 102 to generate a frequency-divided signal f1 and a frequency-divided signal f2. An input terminal of the comparison unit 104 receives a voltage Vcs of the node N1 and a reference voltage Vth1, an input terminal of the comparison unit 106 receives the voltage Vcs of the node N1 and a reference voltage Vth2. Further, power terminals of the comparison unit 104 and the comparison unit 106 receive the frequency-divided signal f1 and the frequency-divided signal f2 from the frequency-dividing unit 114, respectively. The counting unit 108 is coupled between an output terminal of the comparison unit 104 and the pulse width modulation control unit 102, and the counting unit 110 is coupled between an output terminal of the comparison unit 106 and the pulse width modulation control unit 102. As shown in a schematic diagram of FIG. 2 which illustrates waveforms of the pulse width modulation signal VPWM, the frequency-divided signals f1 and f2 and the voltage Vcs of the node N1, in the present embodiment, each of the frequency-divided signals f1 and f2 has ½ frequency of the pulse width modulation signal VPWM, and the frequency-divided signal f2 is at a low voltage level when the frequency-divided signal f1 is at a high voltage level.

Each time when the frequency-divided signal f1 is changed to the high voltage level, the comparison unit 104 is enabled to compare voltage magnitudes of the voltage Vcs and the reference voltage Vth1, and outputs a comparison signal Vc1 according to a comparison result thereof. When the voltage Vcs is greater than the reference voltage Vth1, the counting unit 108 adds one to a count value according to the comparison signal Vc1, so as to count a number of times the voltage Vcs being grater than the reference voltage Vth1. When the count value accumulated by the counting unit 108 is greater than or equal to a first threshold, it indicates that the power conversion apparatus has been continuously generating the voltage Vout having excessive voltage value for at least a predetermined period of time. In this case, the counting unit 108 disables the pulse width modulation control unit 102 to stop switching the power switch Q for reducing an current Ip flowing through the primary side of the transformer T, so as to prevent the power conversion apparatus from continuously generating the excessive voltage Vout which may cause damage/burnout to the power switch Q and/or the electronic apparatus LD. Further, when the voltage Vcs is not greater than the reference voltage Vth1, it indicates that the power conversion apparatus is no longer generating the excessive voltage Vout. In this case, the counting unit 108 resets the count value according to the comparison signal Vc1 from the comparison unit 104.

Figure 2:
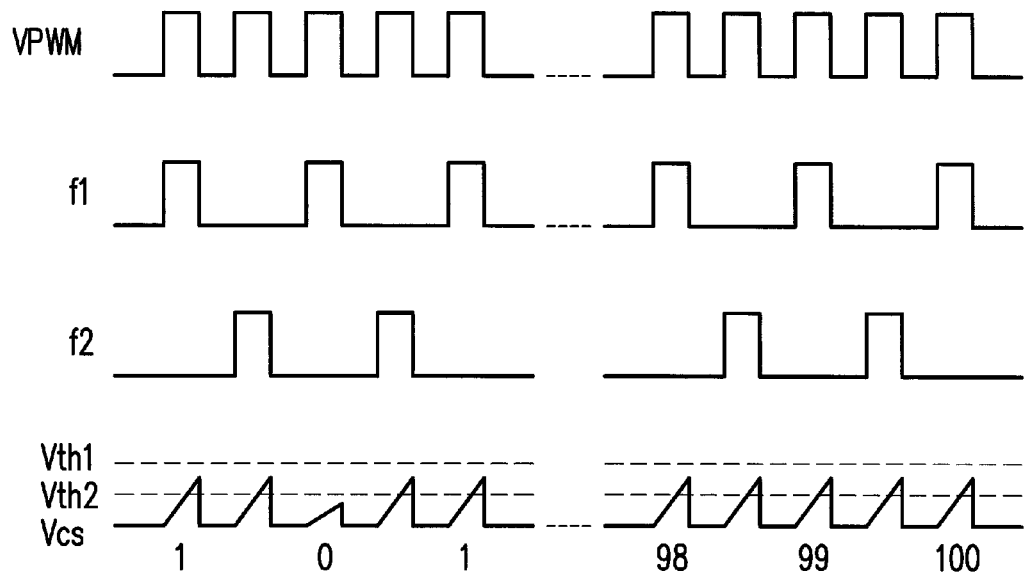
FIG. 2 is a schematic diagram illustrating waveforms of a pulse width modulation signal, frequency-divided signals and a voltage of a node N1 according to an embodiment of the invention.

As shown in FIG. 2, in the embodiment of FIG. 2, values under the waveform of the voltage Vcs represent the count value of the counting unit 108. When a voltage level of the voltage Vcs is lower than the reference voltage Vth1, the count value of the counting unit 108 is reset to 0. Later, when the voltage level of the voltage Vcs is back to be higher than the reference voltage Vth1, the counting unit 108 re-accumulates the count value. When the count value is greater than or equal to the first threshold (this threshold is 100 in the present embodiment, but the invention is not limited thereto), the pulse width modulation control unit 102 is disabled by the counting unit 108 to stop outputting the pulse width modulation signal VPWM (i.e., stop switching the power switch Q). It should be noted that, in some embodiments, the count value of the counting unit 108 is reset to 0 only when the comparison unit 104 has consecutively compared that the voltage level of the voltage Vcs is lower than the reference voltage Vth1 for a number of times in a row (e.g., three times in a row), so as to prevent the count value from being reset due to noise interference which leads to delay on a time point to stop switching the power switch Q.

Similarly, each time when the frequency-divided signal f2 is changed to the high voltage level, the comparison unit 106 is enabled to compare voltage magnitudes of the voltage Vcs and the reference voltage Vth2, and outputs a comparison signal Vc2 according to a comparison result thereof. When the voltage Vcs is greater than the reference voltage Vth2, the counting unit 110 adds one to a count value according to the comparison signal Vc2, so as to count a number of times the voltage Vcs being grater than the reference voltage Vth2. When the count value accumulated by the counting unit 110 is greater than or equal to a second threshold, it indicates that the power conversion apparatus has been continuously generating the voltage Vout having excessive voltage value for a period of time. In this case, the counting unit 110 disables the pulse width modulation control unit 102 to stop switching the power switch Q. Further, if the voltage Vcs is not greater than the reference voltage Vth2, it indicates that power conversion apparatus is no longer generating the excessive voltage Vout. In this case, the counting unit 110 resets the count value according to the comparison signal Vc1 from the comparison unit 106. In the embodiment of FIG. 2, because the voltage Vcs in the embodiment of FIG. 2 stays being less than the reference voltage Vth2, the count value of counting unit 110 continues to be 0.

Figure 3:
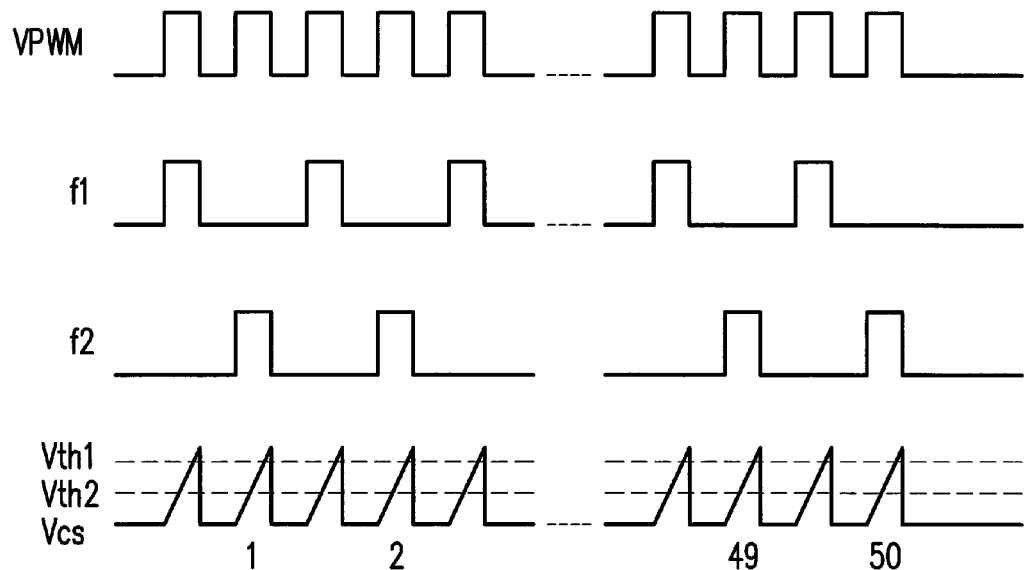
FIG. 3 is a schematic diagram illustrating waveforms of a pulse width modulation signal, frequency-divided signals and a voltage of a node N1 according to another embodiment of the invention.

It should be noted that, in the present embodiment, a voltage level of the reference voltage Vth2 is greater than the voltage level of the reference voltage Vth1, and the first threshold is less than the second threshold. When the power conversion apparatus generates the excessive voltage Vout so that the voltage Vcs is higher than the reference voltage Vth2 in addition to being higher than the reference voltage Vth1, because a speed for increasing the temperature of the power conversion apparatus or the elements inside the load gets quicker as the voltage Vout generated by the power conversion apparatus gets greater, the pulse width modulation control unit 102 must be disabled early to stop switching the power switch Q in order to prevent damage/burnout to the power switch Q and/or the electronic apparatus LD. Therefore, the second threshold is set be less than the first threshold. For instance, as shown in a schematic diagram of FIG. 3 which illustrates waveforms of the pulse width modulation signal VPWM, the frequency-divided signals f1 and f2 and the voltage Vcs of the node N1, in the embodiment of FIG. 3, values under the waveform of the voltage Vcs represent the count value of the counting unit 110. It is assumed herein that the first threshold is set to 100, and the second threshold is set to 50. In a situation where the voltage Vcs is greater than the reference voltage Vth1 and the reference voltage Vth2, the count value of the counting unit 110 may be greater than or equal to the threshold earlier with respect to the count value of the counting unit 108. That is, the count value of the counting unit 110 may reach 50 first to disable the pulse width modulation control unit 102 earlier to stop switching the power switch Q.

By setting different reference voltages and the corresponding thresholds, in addition to decide whether to stop switching the power switch Q earlier according to a degree of the voltage Vout generated by the power conversion apparatus for exceeding the specific output voltage, an error tolerance for determining whether to stop switching the power switch Q may also be increased. For example, when the voltage Vcs is incidentally lower than the reference voltage Vth1 due to a noise caused by the electronic apparatus LD during a period when the comparison unit 104 is not enabled by the frequency-divided signal f1, because the comparison unit 104 has not compare the voltage Vcs and the reference voltage Vth1, the counting unit 108 will not be reset to cause delay on the time point to stop switching the power switch Q.

Figure 4:
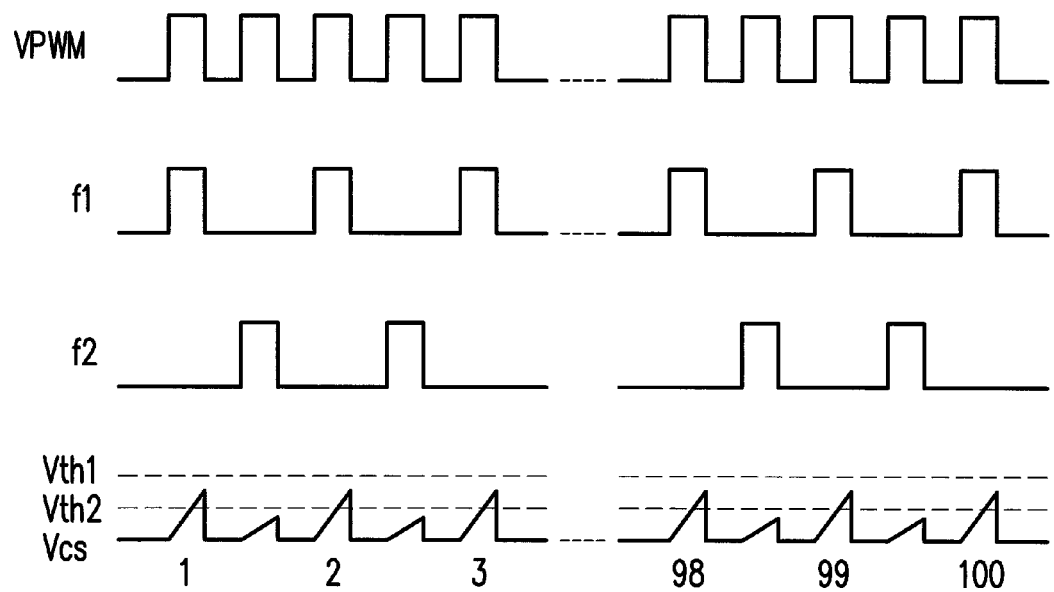
FIG. 4 is a schematic diagram illustrating waveforms of a pulse width modulation signal, frequency-divided signals and a voltage of a node N1 according to another embodiment of the invention.

In addition, when a size of the voltage value of the voltage Vcs periodically changes due to variations in the load at the output terminal of the power conversion apparatus, the power conversion apparatus of the present embodiment may also stop switching the power switch Q in order to protect the power switch Q and/or the electronic apparatus LD. For instance, as shown in a schematic diagram of FIG. 4 which illustrates waveforms of the pulse width modulation signal VPWM, the frequency-divided signals f1 and f2 and the voltage Vcs of the node N1, the size of the voltage value of the voltage Vcs periodically becomes greater and smaller. However, a period when the voltage value of the voltage Vcs is greater than the reference voltage Vth1 is a period when the comparison unit 104 is enabled by the frequency-divided signal f1, and a period when the voltage value of the voltage Vcs is less than the reference voltage Vth1 is a period when the comparison unit 104 is not enabled by the frequency-divided signal f1. Therefore, the count value of the counting unit 108 may still be accumulated continually, instead of being reset by the voltage value of the voltage Vcs being less than the reference voltage Vth1 which results in that the power conversion apparatus fails to stop switching the power switch Q thereby causing damage to the power switch Q and/or the electronic apparatus LD.

Although two comparison units (104, 106) and two corresponding counting units (108, 110) are used in the foregoing embodiments for illustration, amounts of the comparison units and the counting units are not limited thereto. In other embodiments, the power conversion apparatus may include more comparison units and more counting units. That is, the voltage Vcs may be compared with more of different reference voltages in which the reference voltage with higher voltage is corresponding to a lower threshold. Accordingly, the power conversion apparatus may handle the situation where the voltage Vout exceeds the specific voltage more accurately, so as to stop switching the power switch Q at the most appropriate time in order to prevent damage to the power switch Q and/or the electronic apparatus LD.

Figure 5:
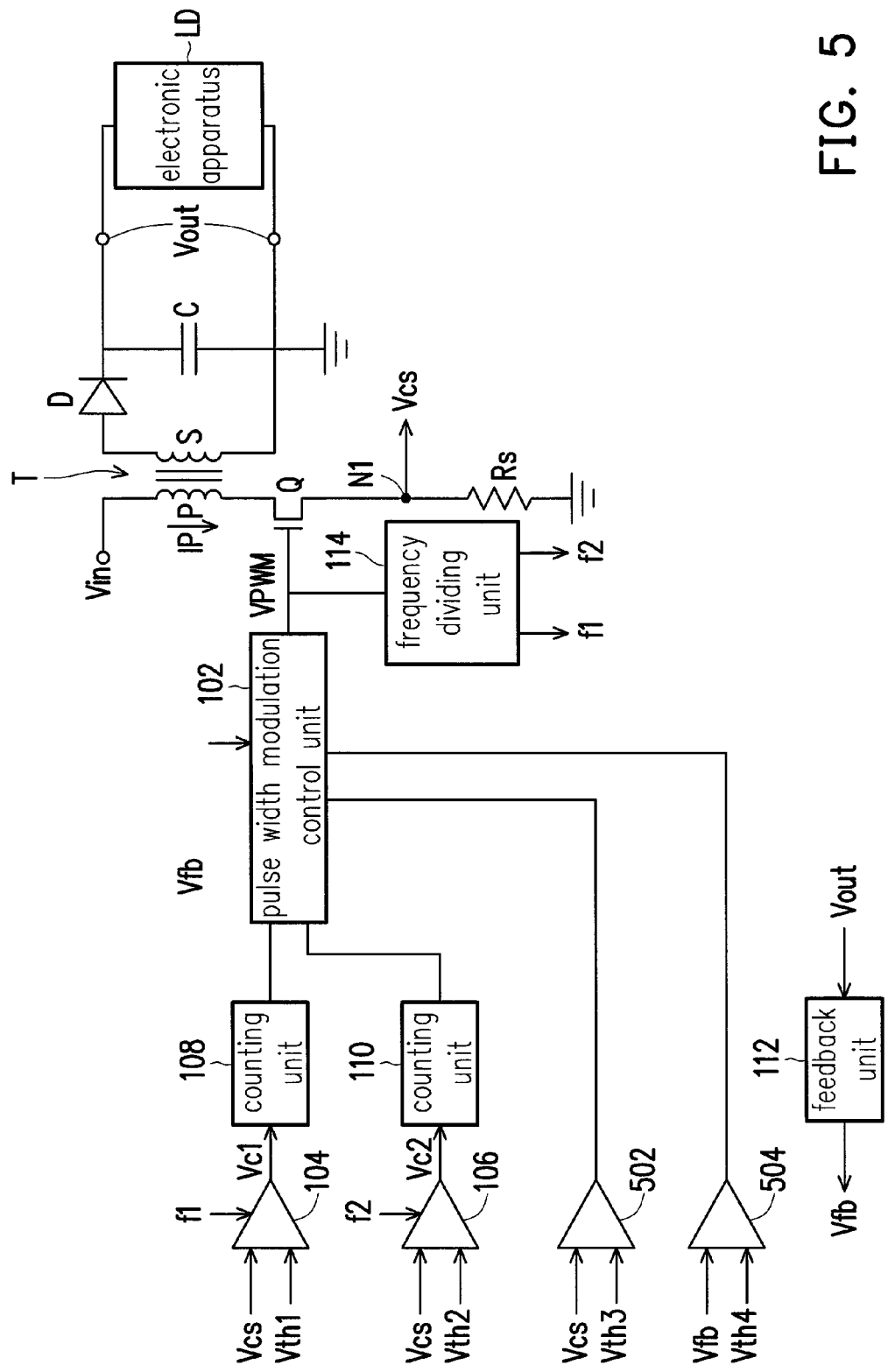
FIG. 5 is a schematic diagram illustrating a power conversion apparatus according to another embodiment of the invention.

Referring to FIG. 5, which is a schematic diagram illustrating a power conversion apparatus according to another embodiment of the invention. In comparison with the power conversion apparatus in the embodiment of FIG. 1, the power conversion apparatus of the present embodiment further includes a comparison unit 502 and a comparison unit 504. An input terminal of the comparison unit 502 receives the voltage Vcs of the node N1 and a reference voltage Vth3, and an output terminal of the comparison unit 502 is coupled to the pulse width modulation control unit 102. An input terminal of the comparison unit 504 receives the feedback signal Vfb and a reference voltage Vth4, and an output terminal of comparison unit 504 is coupled to the pulse width modulation control unit 102. When a comparison result of the comparison unit 502 is that the voltage Vcs is greater than the reference voltage Vth3, the comparison unit 02 directly disables the pulse width modulation control unit 102 to stop switching the power switch Q. The comparison unit 502 disables the pulse width modulation control unit 102 once it is compared that the voltage Vcs is greater than the reference voltage Vth3. That is to say, the power switch Q must be turned off immediately in order to effectively protect the power conversion apparatus because the reference voltage Vth3 is an extremely high voltage for the power conversion apparatus. Accordingly, a voltage value of the reference voltage Vth3 is greater than those of the reference voltage Vth1 and the reference voltage Vth2. Similarly, if it is compared by the comparison unit 504 that a voltage of the feedback signal Vfb is greater than the reference voltage Vth4, the comparison unit 504 also directly disables the pulse width modulation control unit 102 to stop switching the power switch Q.

Figure 6:
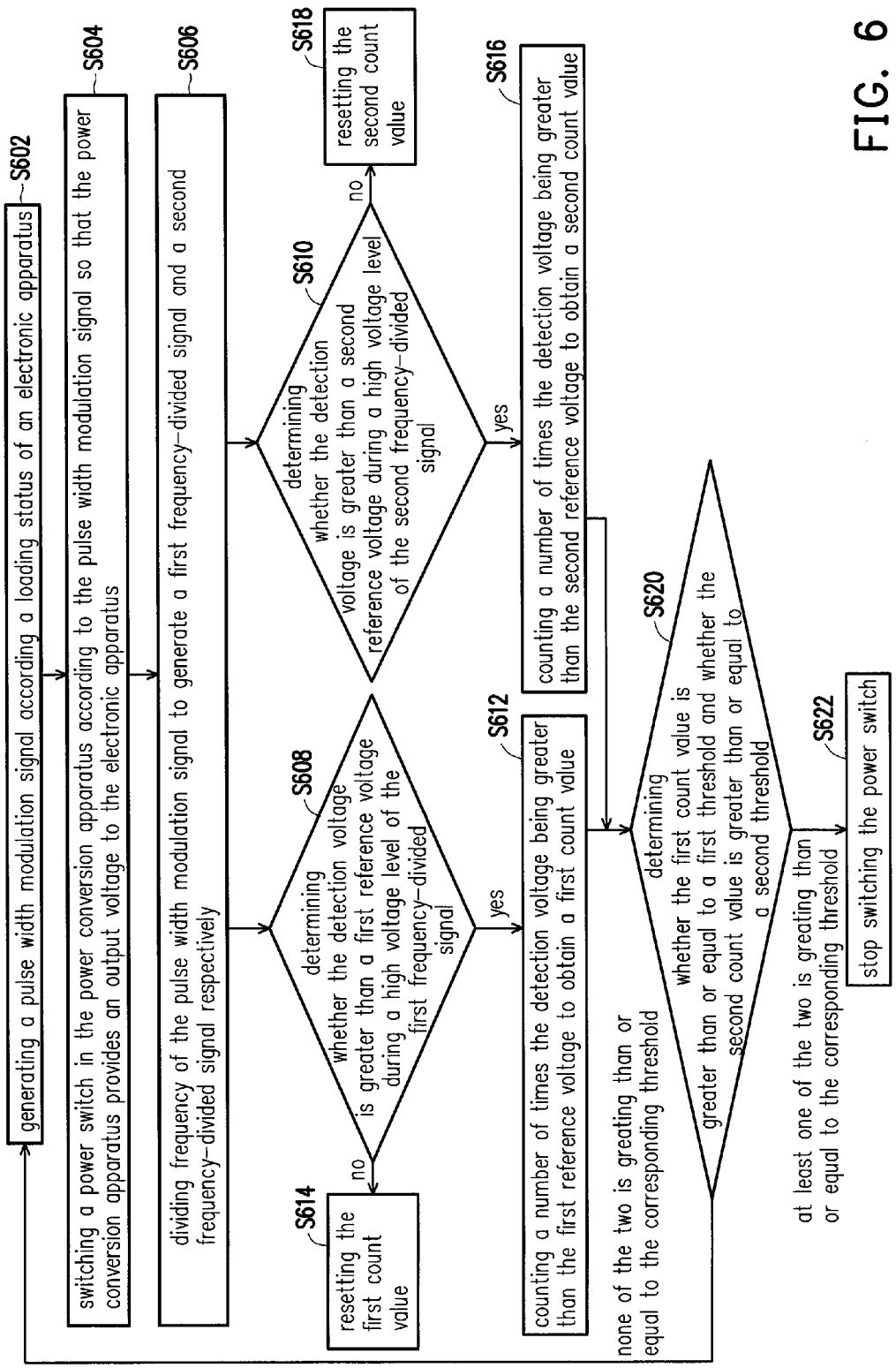
FIG. 6 is a flowchart illustrating an over power protection method of a power conversion apparatus according to an embodiment of the invention.

Referring to FIG. 6, which is a flowchart illustrating an over power protection method of a power conversion apparatus according to an embodiment of the invention. According to description content in foregoing embodiments of the power conversion apparatus, an over power protection method of the power conversion apparatus may include the following steps. First of all, a pulse width modulation signal is generated according a loading status of an electronic apparatus (step S602). Subsequently, a power switch in the power conversion apparatus is switched according to the pulse width modulation signal so that the power conversion apparatus provides an output voltage to the electronic apparatus (step S604). The power switch may be implemented by, for example, a N-type transistor. Then, frequency of the pulse width modulation signal is divided to generate a first frequency-divided signal and a second frequency-divided signal respectively (step S606). Thereafter, whether a detection voltage is greater than a first reference voltage is determined during a high voltage level of the first frequency-divided signal (step S608). In addition, whether the detection voltage is greater than a second reference voltage is determined during a high voltage level of the second frequency-divided signal (step S610). The detection voltage is a voltage on a resistor in response to a current flowing through a power switch. If the detection voltage is greater than the first reference voltage during the high voltage level of the first frequency-divided signal, a number of times the detection voltage being greater than the first reference voltage is counted to obtain a first count value (step S612). Otherwise, if the detection voltage is not greater than the first reference voltage during the high voltage level of the first frequency-divided signal, the first count value is reset (step S614). Similarly, if the detection voltage is greater than the second reference voltage during the high voltage level of the second frequency-divided signal, a number of times the detection voltage being greater than the second reference voltage is counted to obtain a second count value (step S616). Otherwise, if the detection voltage is not greater than the second reference voltage during the high voltage level of the second frequency-divided signal, the second count value is reset (step S618). Subsequently, after step S612 and step S616, whether the first count value is greater than or equal to a first threshold and whether the second count value is greater than or equal to a second threshold are determined (step S620). The first reference voltage is greater than the second reference voltage, and the first threshold is less than the second threshold. If the first count value is greater than or equal to the first threshold value or if the second count value is greater than or equal to the second threshold value, stop switching the power switch (step S622). If the first count value is not greater than or equal to the first threshold value and the second count value is not greater than or equal to the second threshold value, returning back to step S602 in which the pulse width modulation signal is generated according the loading status of the electronic apparatus.

Figure 7A:
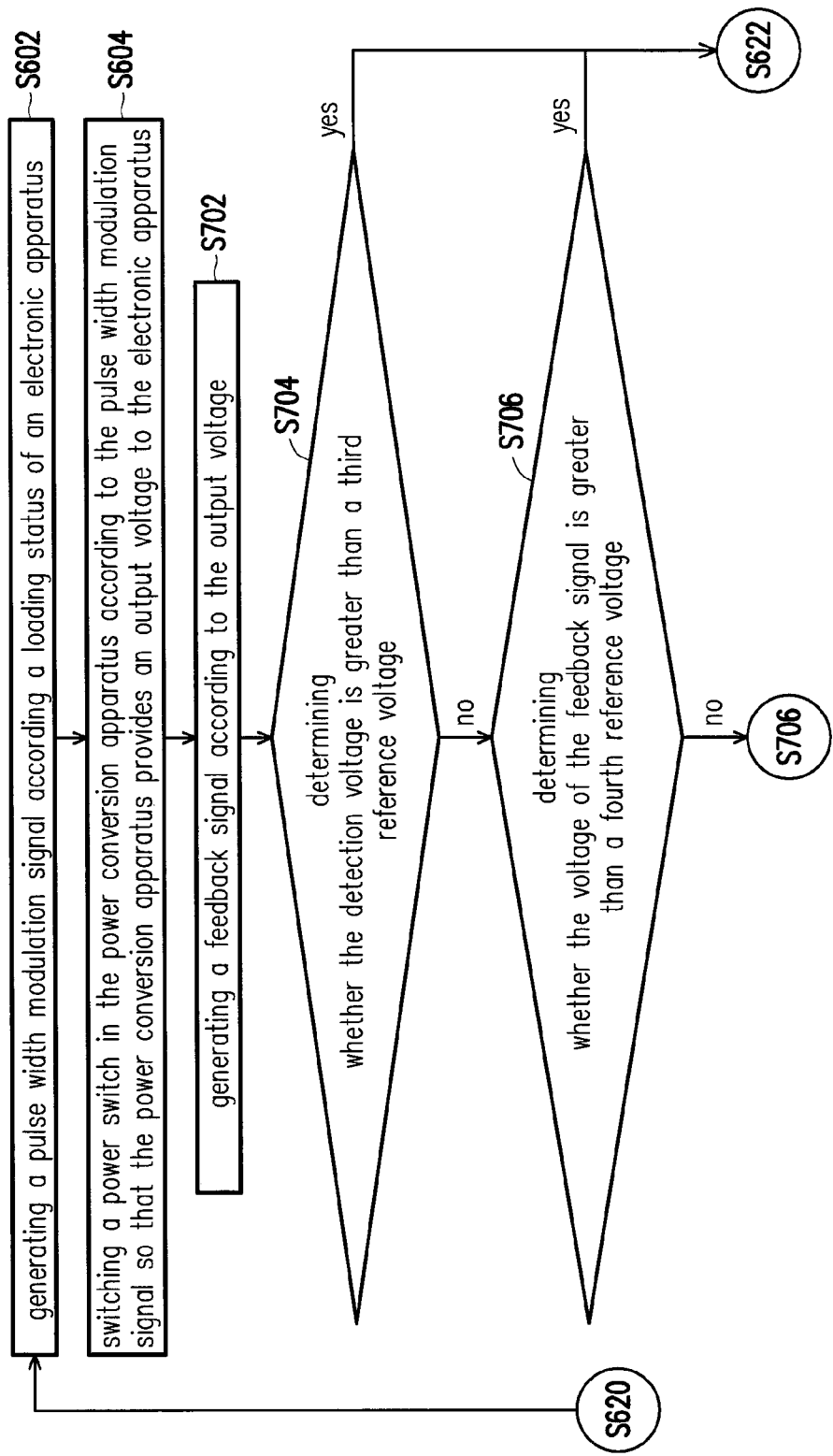
FIG. 7A and FIG. 7B are flowcharts illustrating an over power protection method of a power conversion apparatus according to another embodiment of the invention.
Figure 7B:
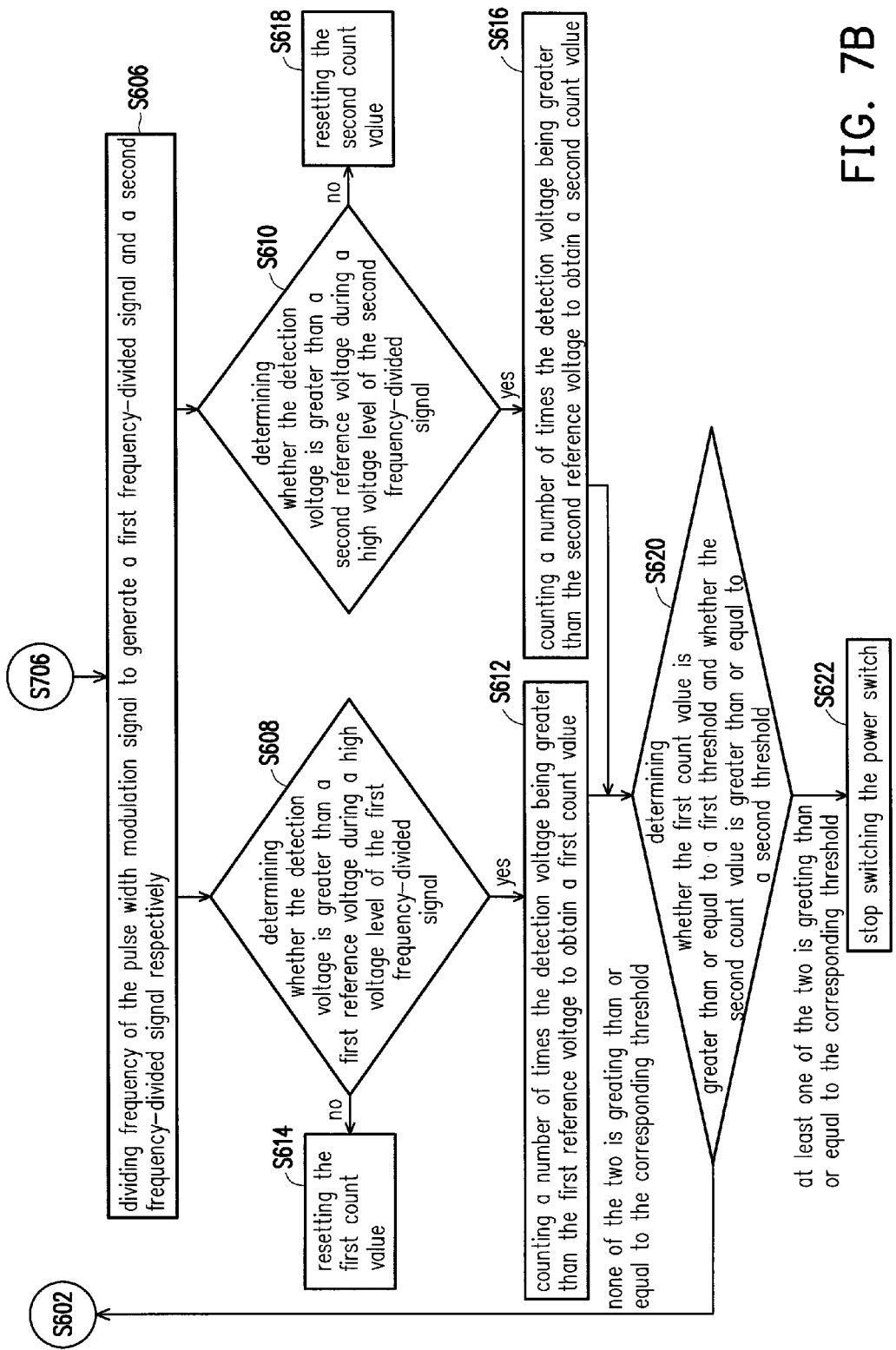

Referring to FIG. 7A and FIG. 7B, which are flowcharts illustrating an over power protection method of a power conversion apparatus according to another embodiment of the invention. In comparison with the over power protection method of the power conversion apparatus according to the embodiment of FIG. 6, the present embodiment further includes steps S702 to S706. After step S604, in the over power protection method of the power conversion apparatus of the present embodiment, a feedback signal is generated according to the output voltage (step S702). Then, whether the detection voltage is greater than a third reference voltage is determined (step S704). The third reference voltage is greater than the first reference voltage and the second reference voltage. If the detection voltage is greater than the third reference voltage, proceeding to step S622 to stop switching the power switch. If the detection voltage is not greater than the third reference voltage, whether a voltage of the feedback signal is greater than a fourth reference voltage is determined (step S706). If the voltage of feedback signal is greater than the third reference voltage, proceeding to step S622 and stop switching the power switch. Otherwise, if the voltage of the feedback signal is not greater than the fourth reference voltage, proceeding to step S606, in which frequency of the pulse width modulation signal is divided to generate a first frequency-divided signal and a second frequency-divided signal respectively.

In summary, according to embodiments of the invention, the number of times the detection voltage being greater than the first reference voltage and the number of times the detection voltage being greater than the second reference voltage are counted, so as to obtain the first count value and the second count value. When the first count value is greater than or equal to the first threshold value or when the second count value is greater than or equal to the second threshold value, stop switching the power switch. The detection voltage is the voltage on the resistor in response to the current flowing through the power switch. Accordingly, the different thresholds may be set for the different reference voltages to stop switching the power switch earlier in case the detection voltage exceeds the specific voltages, such that the power conversion apparatus or the electronic apparatus using the power conversion apparatus may be prevented from damage due to over voltage or over current continuously generated by the power conversion apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power conversion apparatus, comprising:
   a transformer, having a primary side and a secondary side, wherein a first terminal of the primary side is configured to receive an input voltage, and the secondary side is configured to provide an output voltage to an electronic apparatus;
   a power switch, having a first terminal coupled to a second terminal of the primary side, a second terminal coupled to a first node, and a control terminal receiving a pulse width modulation signal;
   a resistor, coupled between the first node and a grounding voltage;
   a pulse width modulation control unit, coupled to the control terminal of the power switch, and generating the pulse width modulation signal for switching the power switch;
   a frequency dividing unit, coupled to the pulse width modulation control unit, and dividing frequency of the pulse width modulation signal to generate a first frequency-divided signal and a second frequency-divided signal;
   a first comparison unit, having a power terminal coupled to the first frequency-divided signal, and comparing a voltage of the first node received by an input terminal of the first comparison unit and a first reference voltage, so as to output a first comparison signal;
   a second comparison unit, having a power terminal coupled to the second frequency-divided signal, and comparing the voltage of the first node received by an input terminal of the second comparison unit and a second reference voltage, so as to output a second comparison signal;
   a first counting unit, coupled between an output terminal of the first comparison unit and the pulse width modulation control unit, counting a number of times the voltage of the first node being grater than the first reference voltage according to the first comparison signal, and disabling the pulse width modulation control unit when the number of times the voltage of the first node being greater than the first reference voltage is greater than or equal to a first threshold; and
   a second counting unit, coupled between an output terminal of the second comparison unit and the pulse width modulation control unit, counting a number of times the voltage of the first node being grater than the second reference voltage according to the second comparison signal, and disabling the pulse width modulation control unit when the number of times the voltage of the first node being greater than the second reference voltage is greater than or equal to a second threshold.

2. The power conversion apparatus according to claim 1, wherein the first comparison unit resets a count value of the first counting unit if the voltage of the first node is not greater than the first reference voltage during a period when the first comparison unit is enabled by the first frequency-divided signal, and the second comparison unit resets the count value of the second counting unit if the voltage of the first node is not greater than the second reference voltage during the period when the second comparison unit is enabled by the first frequency-divided signal.

3. The power conversion apparatus according to claim 1, wherein the first reference voltage is greater than the second reference voltage, and the first threshold is less than the second threshold.

4. The power conversion apparatus according to claim 1, further comprising:
   a third comparison unit, comparing the voltage of the first node received by an input terminal of the third comparison unit and a third reference voltage, and disabling the pulse width modulation control unit when the voltage of the first node is greater than the third reference voltage.

5. The power conversion apparatus according to claim 1, further comprising:
a feedback unit, coupled to the secondary side, and configured to receive the output voltage thereby outputting a feedback signal; and
a fourth comparison unit, coupled to the feedback unit, comparing a voltage of the feedback signal and a fourth reference voltage, and disabling the pulse width modulation control unit when the voltage of the feedback signal is greater than the fourth voltage.

6. An over power protection method of a power conversion apparatus, comprising: generating a pulse width modulation signal according a loading status of an electronic apparatus; switching a power switch in the power conversion apparatus according to the pulse width modulation signal so that the power conversion apparatus provides an output voltage to the electronic apparatus; dividing frequency of the pulse width modulation signal to generate a first frequency-divided signal and a second frequency-divided signal respectively; determining whether a detection voltage is greater than a first reference voltage during a high voltage level of the first frequency-divided signal, wherein the detection voltage is a voltage on a resistor in response to a current flowing through the power switch; determining whether the detection voltage is greater than a second reference voltage during a high voltage level of the second frequency-divided signal; counting a number of times the detection voltage being greater than the first reference voltage to obtain a first count value if the detection voltage is greater than the first reference voltage; counting a number of times the detection voltage being greater than the second reference voltage to obtain a second count value if the detection voltage is greater than the second reference voltage; determining whether the first count value is greater than or equal to a first threshold and whether the second count value is greater than or equal to a second threshold; and stop switching the power switch if the first count value is greater than or equal to the first threshold value or if the second count value is greater than or equal to the second threshold value.

7. The over power protection method of the power conversion apparatus according to claim 6, wherein resetting the first count value if the detection voltage is not greater than the first reference voltage, and resetting the second count value if the detection voltage is not greater than the second reference voltage.

8. The over power protection method of the power conversion apparatus according to claim 6, wherein the first reference voltage is greater than the second reference voltage, and the first threshold is less than the second threshold.

9. The over power protection method of the power conversion apparatus according to claim 6, further comprising:
determining whether the detection voltage is greater than a third reference voltage, and stop switching the power switch if the detection voltage is greater than the third reference voltage.

10. The over power protection method of the power conversion apparatus according to claim 6, further comprising:
generating a feedback signal according to the output voltage; and
determining whether a voltage of the feedback signal is greater than a fourth reference voltage, and stop switching the power switch if the voltage of the feedback signal is greater than the fourth reference voltage.

* * * * *